(12) United States Patent
Emerson et al.

(10) Patent No.: US 9,473,323 B2
(45) Date of Patent: Oct. 18, 2016

(54) GLOBAL TEXT GATEWAY FOR TEXT MESSAGES

(75) Inventors: David E. Emerson, Overland Park, KS (US); Gary LaFreniere, Olathe, KS (US); Mike Goergen, Medford, OR (US); Kelsyn D. S. Rooks, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1103 days.

(21) Appl. No.: 12/465,057

(22) Filed: May 13, 2009

(65) Prior Publication Data
US 2010/0291902 A1 Nov. 18, 2010

(51) Int. Cl.
*H04L 12/58* (2006.01)

(52) U.S. Cl.
CPC ....... *H04L 12/5855* (2013.01); *H04L 12/5835* (2013.01); *H04L 51/066* (2013.01); *H04L 51/14* (2013.01)

(58) Field of Classification Search
CPC .............................. H04W 4/12; H04W 28/14
USPC ................... 455/412.1, 466, 414.1
See application file for complete search history.

(56) References Cited

U.S. PATENT DOCUMENTS

| | | | |
|---|---|---|---|
| 5,825,865 A * | 10/1998 | Oberlander et al. ..... | 379/211.02 |
| 6,289,223 B1 | 9/2001 | Mukherjee et al. | |
| 6,625,460 B1 | 9/2003 | Patil | |
| 6,856,809 B2 | 2/2005 | Fostick | |
| 6,904,131 B2 * | 6/2005 | Weksel ...................... | 379/88.14 |
| 6,915,138 B2 | 7/2005 | Kraft | |
| 7,058,586 B1 * | 6/2006 | Law .................... | 705/5 |
| 7,269,431 B1 * | 9/2007 | Gilbert .......................... | 455/466 |
| 7,366,528 B1 | 4/2008 | Mikan | |
| 2002/0187794 A1 * | 12/2002 | Fostick et al. ................ | 455/466 |
| 2003/0119532 A1 * | 6/2003 | Hatch ............................ | 455/466 |
| 2006/0168297 A1 * | 7/2006 | Kang et al. .................... | 709/231 |
| 2009/0271486 A1 * | 10/2009 | Ligh et al. ..................... | 709/206 |
| 2009/0286560 A1 * | 11/2009 | Willis ............................ | 455/466 |
| 2010/0049702 A1 * | 2/2010 | Martinez ................. | H04L 12/58 707/769 |
| 2010/0146057 A1 * | 6/2010 | Abu-Hakima et al. ....... | 709/206 |
| 2011/0223945 A1 * | 9/2011 | Bhatnagar ..................... | 455/466 |

OTHER PUBLICATIONS

"Discussions>Getting Started> SMS forwarding—on other services?", GrandCentral Help Group (Google Groups).
"Hey GrandCentral where's the SMS forwarding?", aBrilliantBlog.
"SMS Forwarder User Guide," Wireless Labs Technologies, © 2006-2008.
"SMS Forwarder", Wireless Labs.

* cited by examiner

*Primary Examiner* — Shantell L Heiber
(74) *Attorney, Agent, or Firm* — Swanson & Bratschun, L.L.C.

(57) ABSTRACT

Disclosed are a system and method for selective delivery of text messages using a global text gateway in communication with a database of delivery criteria for text messages in which a user can program delivery criteria for text messages directed to a telephone number, wherein the global text gateway is associated with the telephone number so that text messages addressed to the telephone number are routed to the global text gateway and wherein the global text gateway is adapted to forward text messages to a communication network for delivery based on the delivery criteria.

16 Claims, 5 Drawing Sheets

Text Message Rules: — 300

- Block the message — 302
- Delay forwarding the message — 304
- Send a predetermined reply — 306
- Forward the message to any number of different text capable telephone numbers — 308
- Transcode the message to an e-mail and send it to any number of e-mail addresses — 310
- Transcode the message into a voice message and deliver it to a landline telephone number, a voicemail box and/or send it to any number of e-mail addresses as a sound file attachment — 312
- Transcode the message to an IM chat string and send it to any number of IM addresses — 314
- Copy message to storage device — 316

*Fig. 4*

Text Message Rule Parameters: — 350

- Phone number of sender — 352
    - Relationship category (e.g., Friend, Relative, Coworker, Customer, etc.) — 354
- Time-of-day / day-of-week — 356
- Presence feedback (e.g., IM client open, mobile telephone active, GPS feedback from mobile telephone, etc.) — 358
- Transient condition (e.g., on vacation, in meeting, etc.) — 360

*Fig. 5*

GLOBAL TEXT GATEWAY FOR TEXT MESSAGES

BACKGROUND

Text messaging utilizes standardized communication protocols to allow the interchange of text messages between mobile telephone devices. Various communication standards enable individuals to send and receive short text messages on a wireless device over communication channels that are usually separated from voice call channels for the mobile device. For example, short message service (SMS) is a standardized communication service originally used in the GSM mobile communication system. SMS is a globally accepted wireless service that facilitates the transmission of alphanumeric messages between mobile subscribers in some external systems. SMS text messaging is currently the most popular text messaging standard for sending and receiving text messages on mobile telephones.

Text messaging began as a method for telephone companies to provide mass communication with its subscribers. Mobile telephone networks are generally optimized for telephony service, since this was identified as their main application. The key idea for text messaging was to use this telephony-optimized system to transport text messages on the signaling paths needed to control the telephony traffic during time periods when no signaling traffic existed. In this way, unused network resources in the system were used to transport text messages without significant additional cost. However, limitations in these signaling paths limit the length of the message (currently approximately 160 characters for SMS messages) so that the text messages could fit into the existing signaling formats. Originally, text messaging was limited to in-network communications. However, as individuals begin utilizing text messaging for communication with each other, intercarrier gateway networks were developed for sending messages between carriers.

The advent of text messaging has provided numerous benefits to wireless communication that were previously unavailable. For example, text messages do not require a wireless telephone to be activated or within range in order to handle a message. In instances where the receiving telephone is not available, text messages can be stored in a message center for a number of days until the mobile telephone is active again. Another distinguishing characteristic of text messages is that an active wireless telephone is able to receive or submit a text message independent of whether or not a voice or data call is in progress.

Text messages, however, are traditionally a point-to-point or one-to-one communication method. In transmitting messages, a text message is traditionally transmitted from a wireless telephone to a short message service center ("SMSC") that acts as a store and forward system for text messages. The wireless network provides for the transmission of text messages between the SMSC and the receiving wireless telephone. Text messages are usually only sent by one individual and received by one individual enabling two persons to have a one-to-one conversation. Disclosed herein is a system and method that enhances existing text messaging networks.

BRIEF DESCRIPTION OF THE DRAWINGS

FIG. 4 illustrates text message delivery rules.

FIG. 5 illustrates parameters modifying the rules of FIG. 4.

DETAILED DESCRIPTION OF THE DRAWINGS

Figure 1:
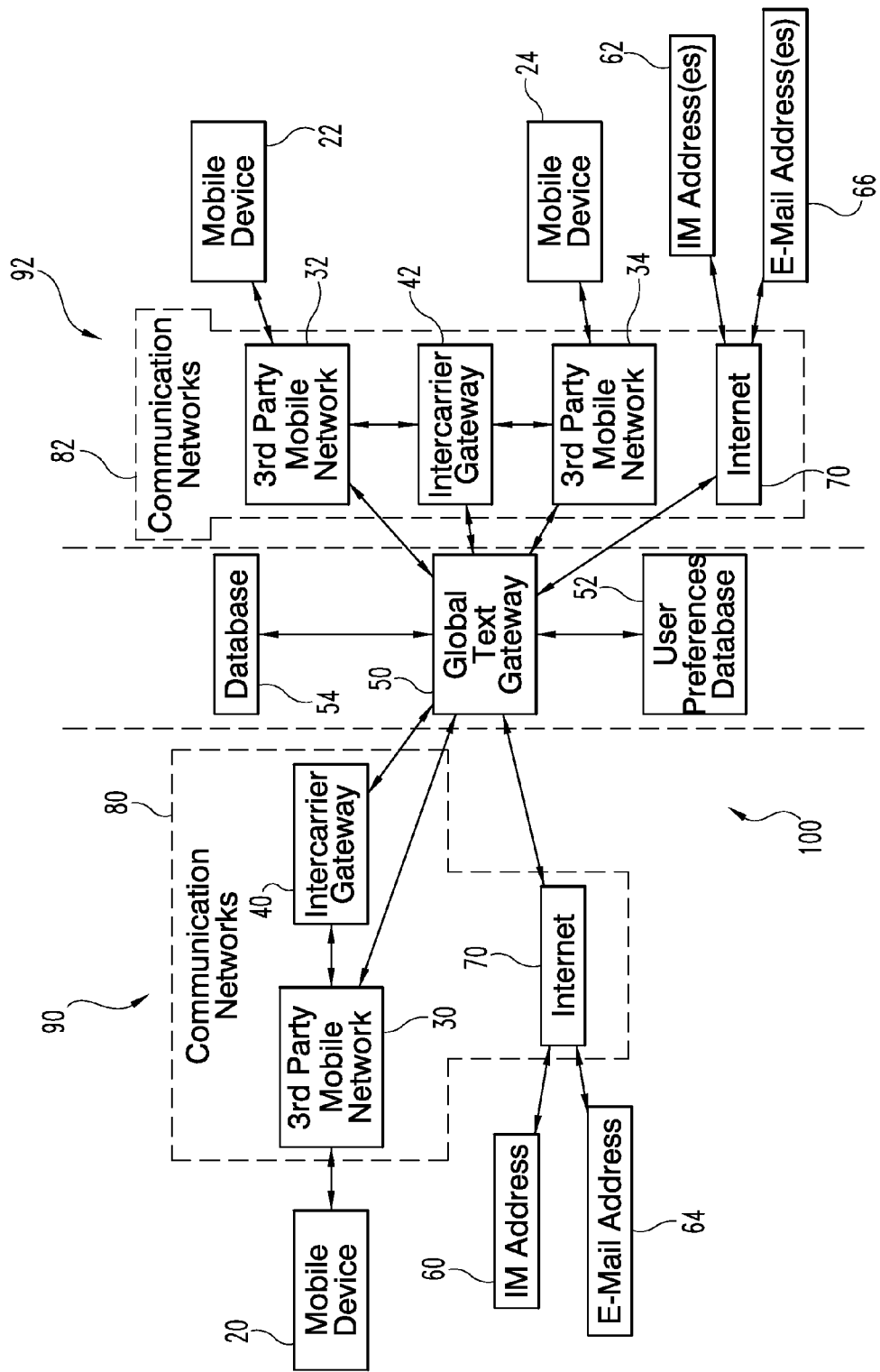
FIG. 1 illustrates a system diagram of a text message communication system utilizing a global text gateway.

For the purpose of promoting an understanding of the claims, reference will now be made to certain embodiments thereof and specific language will be used to describe the same. It will nevertheless be understood that no limitation of the scope of this disclosure and the claims are thereby intended, such alterations, further modifications and further applications of the principles described herein being contemplated as would normally occur to one skilled in the art to which the disclosure relates. In several figures, where there are the same or similar elements, those elements are designated with the same or similar reference numerals.

Disclosed herein is a system and method that serves as an enhancement to existing text messaging networks. This system and method involve new software, hardware and process changes that permit text message delivery to be dynamically controlled by the recipient of the text message. The system and method include the use of a new network component described herein as a global text gateway that serves as an intermediary between the sender and receiver of a text message. The global text gateway acts as the actual recipient for sent text messages and the global text gateway then repeats or forwards the text message as dictated by delivery parameters set by the end user. In one embodiment, the global text gateway can be a stand alone system that interfaces with existing third party mobile networks and intercarrier gateways. In this embodiment, the global text gateway may be assigned a unique telephone number that the user can disseminate for text messaging purposes. This telephone number would not be directly associated with any hand held mobile device but would act as a universal text message telephone number for the user. In an alternative embodiment, the global text gateway may be incorporated directly into a service provider's mobile network. In this embodiment, the telephone number of a user's mobile device can be used, but with the service provider I.D. (hereinafter "SPID") associated with the telephone number changed from the service provider to the global text gateway, so that any text communication directed to the telephone number would be automatically directed to the global text gateway rather than to the service provider's network for sending the message to the user's mobile device.

The global text gateway may provide the user with the ability to control many aspects of text message delivery, including the destination to which text messages are delivered, the time of allowable delivery and the format of delivery, among other options described below.

Referring now to FIG. 1, an embodiment of communication system 100 incorporating global text gateway 50 as a stand alone component (independent of a particular service provider network) is illustrated. FIG. 1 is generally divided in half by incoming communications 90 on the left side of FIG. 1 and outgoing communications 92 on the right side of FIG. 1 with the global text gateway positioned there between.

Incoming communications 90 generally include mobile device 20, instant messaging (IM) address 60 and e-mail address 64 that serve as potential sending mediums for text messages addressed to global text gateway 50. The text message sent from mobile device 20, IM address 60 or e-mail address 64 are transmitted through communication network 80 to global text gateway 50. Communications network 80 generally includes third party mobile network 30, intercarrier gateway 40 and internet 70. In some embodiments, third party mobile network 30 may be directly connected to global text gateway 50. In other embodiments, third party mobile network 30 may be connected to global text gateway 50 through intercarrier gateway 40. Third party mobile network 30 may generally include the system elements used by a mobile network carrier to transmit and receive voice and text communications from mobile devices. The particularities of mobile network 30 may vary between carriers. As described above, in this embodiment text messages sent by mobile device 20, IM address 60 or e-mail address 64 are addressed to a telephone number that is associated with global text gateway 50.

Global text gateway 50 is functionally connected to user preference database 52 and database 54. While not illustrated, user preference database 52 is accessible and modifiable by the user by various means known in the art including internet connection to a web page and interface through a handheld mobile device. Database 54 is optionally included as a storage medium for global text gateway 50 for functions described below.

Outgoing communications 92 generally includes mobile device 22 and 24, IM addresses 62 and e-mail addresses 66, all of which are coupled to global text gateway 50 through communication network 82. Communication network 82 includes third party mobile networks 32 and 34, intercarrier gateway 42 and internet 70. Once again, third party mobile networks 32 and 34 can directly communicate with global text gateway 50 or may utilize intercarrier gateway 42 as an intermediary. While only mobile devices 22 and 24 are illustrated, it should be understood that any number of mobile devices could be recipients of outgoing communications from global text gateway 50 as described below. Similarly, multiple IM addresses 62 and/or e-mail addresses 66 may be the destination for outgoing communication from global text gateway 50.

Figure 2:
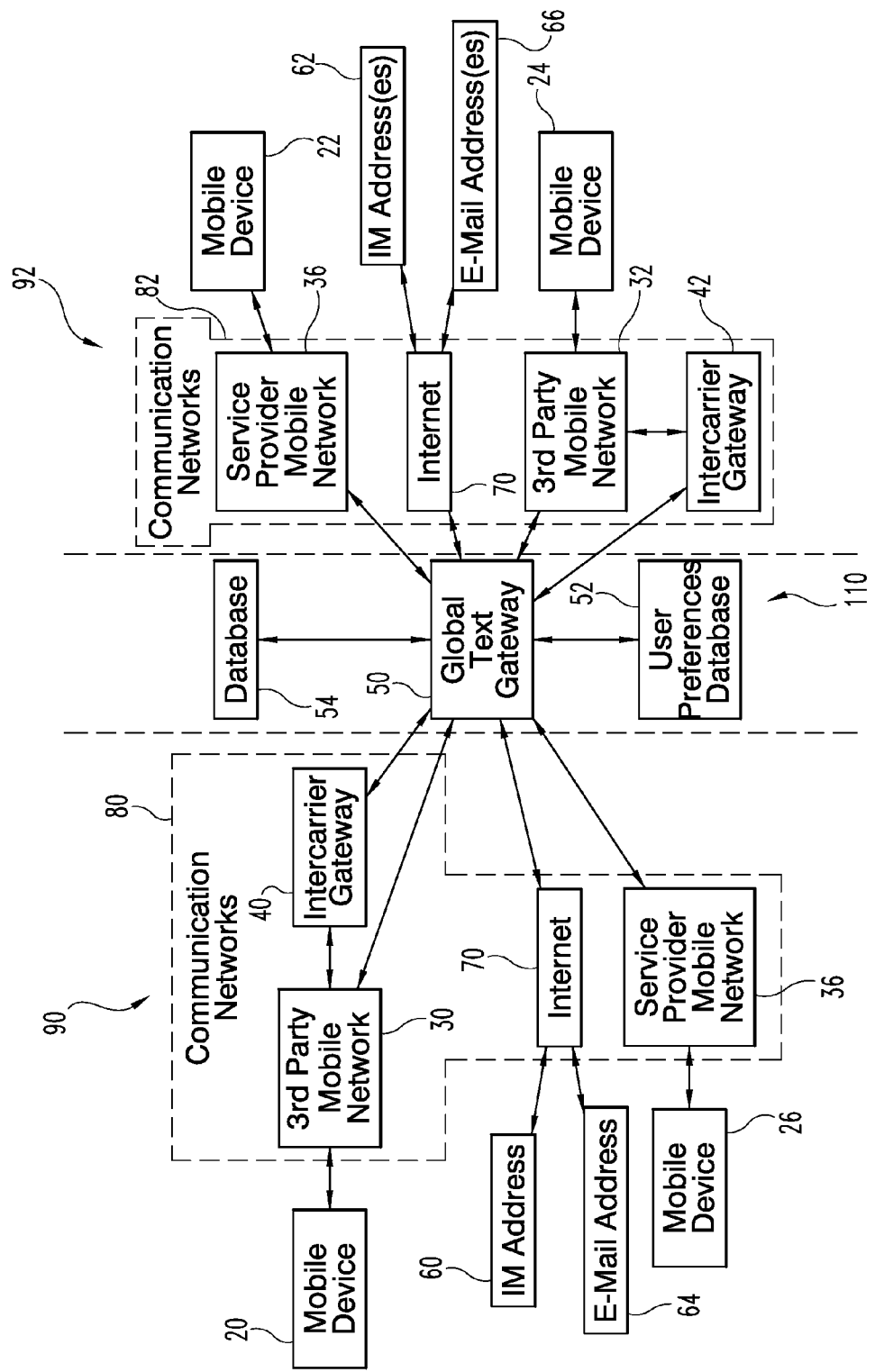
FIG. 2 illustrates an alternate embodiment of the FIG. 1 text message communication system utilizing the global text gateway.

Referring now to FIG. 2, system 110 is illustrated including global text gateway 50 incorporated into a service provider's mobile network. Once again, system 110 is generally divided in half with incoming communications 90 positioned on the left side of the diagram and outgoing communications 92 positioned on the right side of the diagram with global text gateway 50 positioned there between. System 110 is similar to system 100 but with global text gateway 50 incorporated more directly with a particular service provider's mobile network which includes the possibility of service provider mobile network 36 replacing third party mobile network 30, 32 and 34 on the incoming and/or outgoing communication of system 110. While illustrated as a separate component in system 110, global text gateway may be directly incorporated with service provider mobile network 36 in alternative embodiments.

Incoming communications 90 includes mobile devices 20 and 26, IM addresses 60 and e-mail addresses 64 as sources of incoming text communication which are transmitted through communication network 80 to global text gateway 50. Communication network 80 includes third party mobile network 30, service provider mobile network 36, intercarrier gateway 40 and internet 70.

Outgoing communications 92 includes mobile devices 22 and 24, IM addresses 62 and e-mail addresses 66 as potential destinations for outgoing communications from global text gateway 50 with communication network 82 connected there between. Communication network 82 includes service provider mobile network 36, internet 70, third party mobile network 32 and intercarrier gateway 42. As described above, third party mobile networks 30 and 32 can either directly communicate with global text gateway 50 or utilize intercarrier gateways 40 and 42 as intermediaries. In this embodiment, global text gateway 50 is associated with a telephone number of a mobile device, with the SPID for that telephone number being associated with global text gateway 50 instead of the service provider's network for delivery messages to the mobile device.

Figure 3:
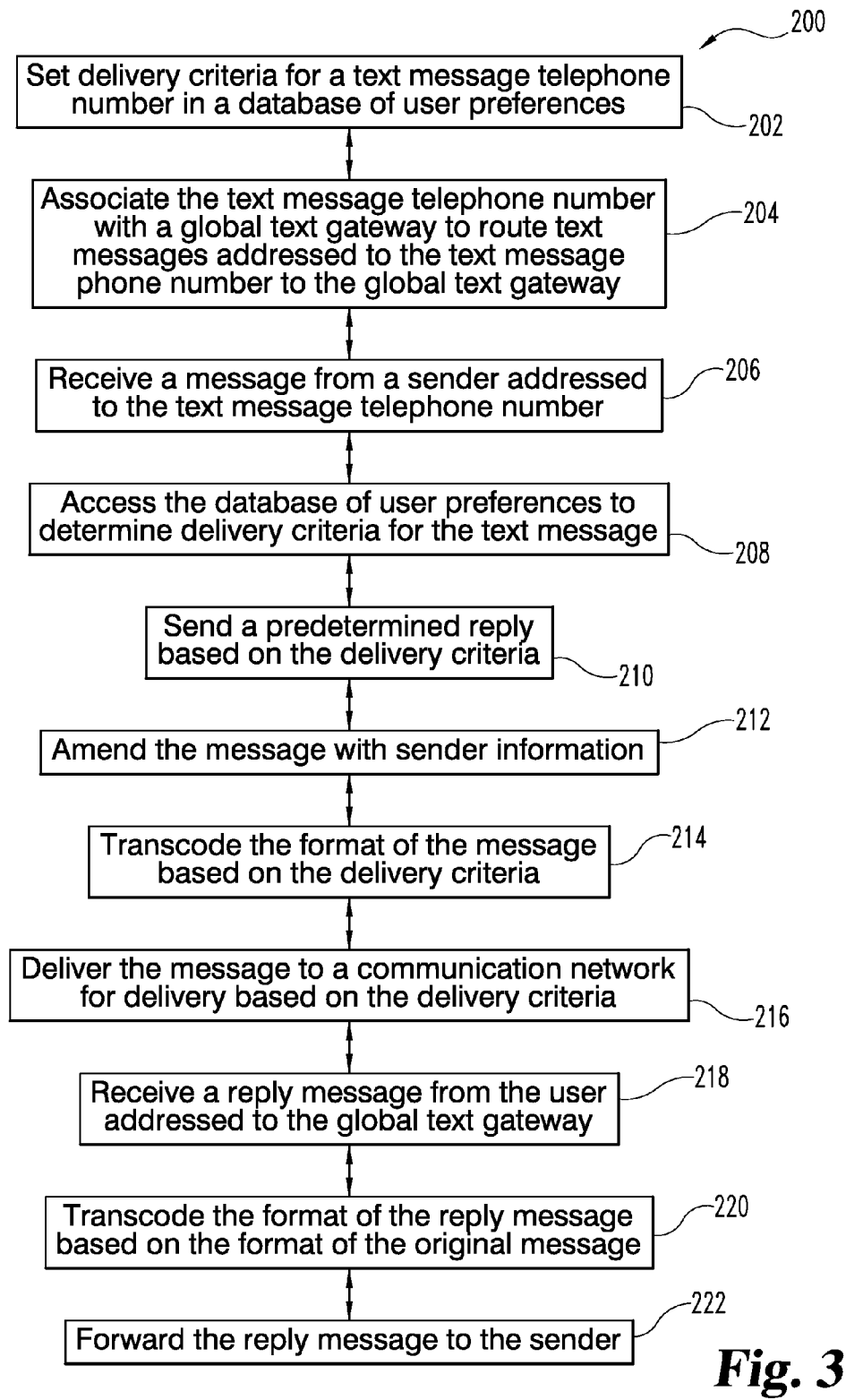
FIG. 3 illustrates a procedure for delivering text messages utilizing a global text gateway.

Referring to FIG. 3, procedure 200 is illustrated. Procedure 200 includes acts for delivering text messages to a customer utilizing a global text gateway 50. Procedure 200 begins with step 202 where a user sets the delivery criteria for a particular text message telephone number in user preference database 52. As described above, step 202 takes place through any available communication medium including the internet or an interface through a hand held device such as the user's mobile telephone. Procedure 200 continues with step 204 where the text message telephone number of the user is associated with global text gateway 50 to route incoming text messages addressed to the text message telephone number to global text gateway 50.

Procedure 200 continues with step 206 where a message from a sender addressed to the user's text message telephone number is received at global text gateway 50. After step 206, global text gateway 50 automatically proceeds to step 208 where user preference database 52 is accessed to determine the particular delivery criteria for text messages for the user at the current conditions (e.g., time, day of week, GPS feedback, IM status, etc.). Examples of the delivery criteria are described below and illustrated in FIGS. 4 and 5. Based on the delivery criteria, global text gateway 50 may optionally proceed to step 210 where a predetermined reply may be sent to the sender of the message based on the delivery criteria. For example, one of the delivery criteria may be to only deliver messages between 8:00 a.m. and 6:00 p.m. and if a message comes in after 6:00 p.m. a standard predetermined reply may be "Your message is received but will not be viewed until tomorrow morning, I will get back to you at that time."

Procedure 200 continues with step 212 where global text gateway 50 optionally amends the received text message with information relating to the original sender. This provides a mechanism for identifying the sender to the user when the message is eventually forwarded to the user. In alternative embodiments, additional information can be included with the text message that is not in text form that includes sender information. In yet another embodiment, the text message can be amended with an alphanumeric code referencing a database in the user's telephone such as an address book identifying a known sender to the user without use of a comparatively long numeric telephone number.

Also based on the delivery action determined in step 208, procedure 200 optionally proceeds to step 214 where the format of the message is transcoded to a different format. For example, if the delivery criteria directs global text gateway 50 to forward the message to an e-mail address, then the incoming text message may be transcoded to a format appropriate for e-mail. Similarly, a message could be transcoded into an instant message format ("IM") or into alternative formats used in various communication protocols.

Procedure 200 continues with step 216 where the message received by global text gateway 50 is delivered to communication network 82 for delivery to the user based on the delivery criteria accessed in user preference database 52. The delivery criteria may specify that the message be forwarded to any number of different destinations. Delivery to mobile device 22 or 24 is accomplished using the systems and protocols for the service provider for mobile device 22 or 24. In system 100, the message can be forwarded to $3^{rd}$ party mobile network 32 or 34 addressed to the telephone number for mobile device 22 or 24. In system 110, the message can be forwarded to mobile device 22 by accessing mobile device 22 with the underlying network phone identification information for mobile device 22 rather than addressing the message to the telephone number of mobile device 22, as that telephone number is associated with global text gateway 50 for text messages. Thus, the configuration of system 110 requires that the service provider for mobile device 22 permit message delivery to mobile device 22.

Still referring to FIG. 3, if the user replies to the message sent in step 216 then procedure 200 continues with step 218 where global text gateway 50 receives a reply message from the user that is addressed to the global text gateway. Once received, global text gateway 50 may optionally proceed with step 220 where the format of the reply message is transcoded, if necessary, to match the format of the originally sent message. Procedure 200 is completed with step 222 where global text gateway 50 forwards the reply message through communication network 82 to the sender's original address. In one embodiment, global text gateway 50 stores the original sender address information in database 54 to be recalled if a reply message is received to ensure proper addressing and formatting of the reply message. In other embodiments, the sender information can be amended to the text message so that the sender information is associated with the reply message to permit global text gateway 50 to properly address and format the reply message for delivery to the sender.

Referring now to FIG. 4, one embodiment of text message rules are illustrated as rule set 300. Rule set 300 generally includes rules 302, 304, 306, 308, 310, 312, 314 and 316. Rule 302 blocks the incoming sent message so that it is not forwarded to any destination. Rule 304 delays forwarding the message. Rule 306 sends a predetermined reply to the sender. Rule 308 forwards the message to any number of different text capable telephone numbers. Rule 310 transcodes the message to an e-mail format and forwards it to any number of e-mail addresses. Rule 312 transcodes the message to a voice message and delivers it to a land line number, a voicemail box or forwards it to any number of e-mail addresses as a sound file attachment. Rule 314 transcodes the message as an IM chat string and forwards it to any number of IM addresses. Rule 316 copies the message to a storage device such as database 54.

Referring now to FIG. 5, one embodiment of text message rule parameters are illustrated as parameter set 350. Parameter set 350 generally includes parameters 352, 354, 356, 358 and 360. Parameter 352 is the telephone number of the sender. Parameter 354 is an optional relationship category (list) such as friend, relative, coworker or customer, generally based on the telephone number of the sender (parameter 352). Parameter 356 is the time of day and/or the day of the week. Parameter 358 is presence feedback, for example, an IM client being available, a mobile telephone being active or position feedback from mobile telephone GPS information. Parameter 360 includes transient conditions, for example, the user setting a temporary condition such as being on vacation or in a meeting, etc.

Combining rule set 300 and parameter set 350 in user preference database 52 permits the user wide latitude in control and distribution of incoming text messages. For example, a user could set the global text gateway 50 to forward text messages during business hours from customers and coworkers to a business mobile telephone and during the same timeframe, forward messages from friends and relatives to a personal e-mail address. Then after business hours, messages from business coworkers or customers could be forwarded to a business e-mail address while messages from friends and family could be sent directly to a personal mobile telephone. In each case, global text gateway 50 could be configured to send an automatic reply message for messages that are sent to e-mail rather than sent directly to a mobile telephone to indicate to the sender that there will be a delay before their text message is received. Using presence feedback parameter 358, global text gateway 50 could be instructed to forward incoming text messages directly to a user's computer via instant messaging when that client is available or alternatively to e-mail if it is not (or to a mobile telephone or any other option the user desires). Similarly, if global text gateway 50 determines that a user's mobile telephone is currently unavailable, then the message could be sent to e-mail and delivery of the text message could be delayed using standard network procedures to wait until the mobile device is available to deliver the message. Parameter 360 in combination with rule 306 provides the user the ability to provide an out-of-office automatic reply when on vacation while appropriately forwarding the text message to whatever destination the user desires for later retrieval.

Figure 6:
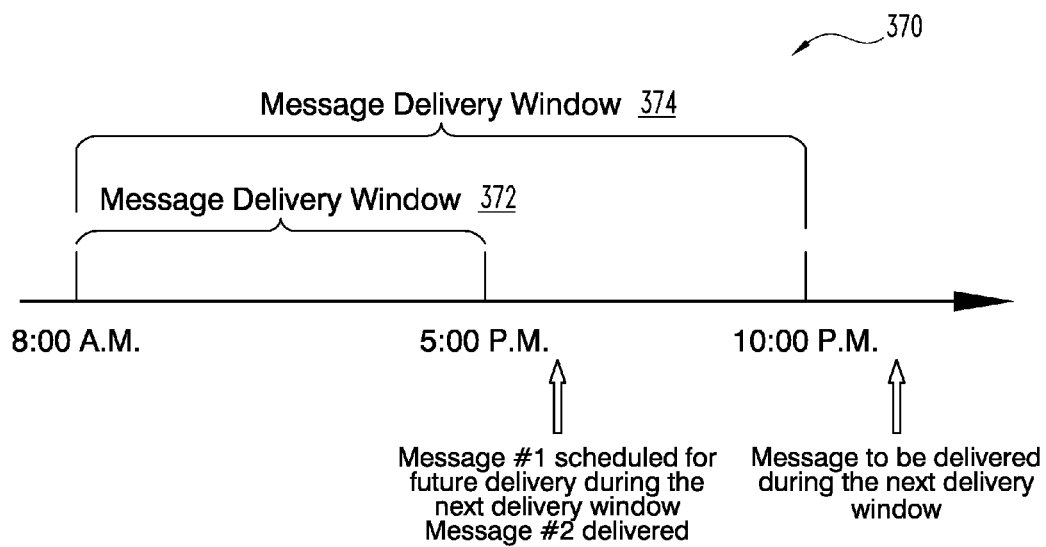
FIG. 6 illustrates a time-line of events according to one embodiment of the parameters of FIG. 5.
Figure 7:
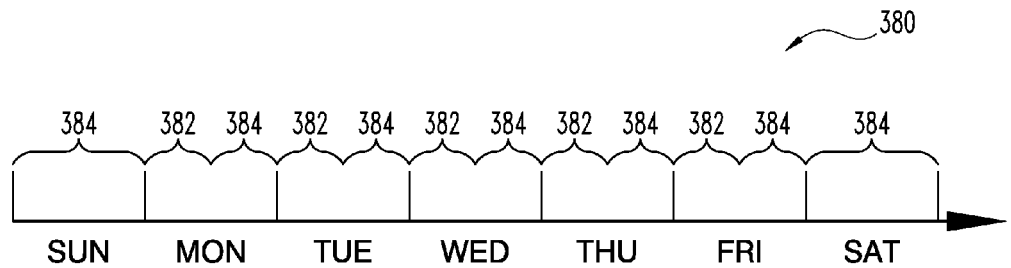
FIG. 7 illustrates a time-line of events according to one embodiment of the parameters of FIG. 5.

Referring now to FIGS. 6 and 7, embodiments of parameter 356 are provided as timelines 370 and 380. Timeline 370 provides an example for a particular day including message delivery windows 372 and 374. For example, message delivery window 372 may be correlated in global text gateway 50 with senders who are coworkers or customers for delivery to a particular handset while message delivery window 374 could be correlated to senders that are friends or relatives for delivery. As illustrated, delivery windows 372 and 374 overlap but do not encompass the entire day so a message delivered after the expiration of delivery window 372 from a coworker or customer could be scheduled for future delivery during the next available delivery window whereas a message from a friend or family at the same time would be delivered. A message delivered outside of either delivery windows 372 or 374 could then be delivered during the next delivery window and/or rerouted to another destination such as e-mail.

Timeline 380 illustrates how a user can customize the delivery windows on different days of the week. For example, delivery window 382 only exists Monday through Friday, while delivery window 384 is used each day of the week and includes all of Saturday and Sunday and only evening hours Monday through Friday. In this example, delivery window 382 could be associated with business contacts such as coworkers and customers while delivery 384 is associated with personal contacts such as friends or family.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A system for selective delivery of text messages comprising:
    a database of delivery criteria for text messages, wherein the database is adapted to be accessed by a customer to set a customer's delivery criteria for a customer's telephone number associated with the customer, wherein the delivery criteria specify one or more message delivery windows and wherein the delivery criteria are automatically modifiable based on a presence feedback parameter comprising global positioning system location information for the customer; and
    a global text gateway adapted to communicate with the database to access the customer's delivery criteria, wherein a text message telephone number associated only with the global text gateway is assigned to the global text gateway, so that text messages addressed to the text message telephone number are routed directly to the global text gateway, wherein the global text gateway is adapted to forward text messages to a communication network for delivery to the customer's telephone number based on the customer's delivery criteria and based at least in part on the global positioning system location information for the customer, such that messages received when the customer is located at designated locations are scheduled to be delivered at a next occurrence of one of the one or more message delivery windows, and wherein the global text gateway is further configured to receive a reply message from the customer responsive to the text message, transcode the format of the reply message to a text message, and forward the transcoded text message to a sender of the text message.

2. The system of claim 1, wherein the global text gateway is adapted to deliver text messages as e-mail to an e-mail address based on the delivery criteria for the text message telephone number.

3. The system of claim 1, wherein the delivery criteria includes rules selected from the group consisting of blocking, delaying, forwarding, automatic replying, redirecting and transcoding text messages.

4. The system of claim 1, wherein the global text gateway is adapted to send an automatic reply text message based on the delivery criteria.

5. The system of claim 1, wherein the global text gateway amends forwarded text messages with sender information.

6. The system of claim 1, wherein the global text gateway is adapted to deliver text messages addressed to the text message telephone number to multiple unique destinations based on the delivery criteria for the text message telephone number.

7. A method for delivering a text message to a customer comprising the acts of:
    setting customer's delivery criteria in a database of user preferences, wherein the database is accessible by a global text gateway in a mobile telephone network that delivers text messages and wherein the database is accessible by the customer to set the customer's delivery criteria for a customer's telephone number, wherein the customer's delivery criteria are automatically modifiable based on a presence feedback parameter comprising global positioning system location information for the customer;
    assigning a text message telephone number to the global text gateway, wherein the text message telephone number is associated only with the global text gateway, so that text messages addressed to the text message telephone number are routed directly to the global text gateway;
    at the global text gateway, receiving the text message from a sender addressed to the text message telephone number;
    at the global text gateway, accessing the database of user preferences to determine the customer's delivery criteria for the text message;
    at the global text gateway, determining that the customer's delivery criteria specify one or more delivery windows based on the global positioning system location information for the customer;
    at the global text gateway, scheduling the text message to be delivered, at a next occurrence of one of the one or more message delivery windows, to a communication network for delivery to the customer's telephone number based on the customer's delivery criteria; and
    at the global text gateway, receiving a reply message from the customer that is responsive to the text message;
    at the global text gateway, transcoding the format of the reply message to a text message and forwarding the transcoded text message to the sender.

8. The method of claim 7, wherein the text message is delivered to a mobile phone through the communication network.

9. The method of claim 7, further comprising the acts of:
    at the global text gateway, receiving a reply text message addressed to the global text gateway; and
    at the global text gateway, forwarding the reply text message to the sender.

10. The method of claim 7, further comprising the acts of: during the receiving act at the global text gateway, receiving an e-mail message from the sender and translating the e-mail message to the text message.

11. The method of claim 10, further comprising the act of:
    at the global text gateway, receiving a reply text message addressed to the global text gateway; and
    translating the reply text message to a reply e-mail message and forwarding the reply email message to the sender.

12. The method of claim 7, further comprising the act of:
    at the global text gateway, automatically replying to the text message with a predetermined message based on the delivery criteria.

13. The method of claim 7, wherein the delivery criteria include rules selected from the group consisting of blocking, forwarding, automatic replying, redirecting and transcoding text messages.

14. The method of claim 7, wherein the delivering act includes delivering the text message to multiple, unique destinations based on the delivery criteria.

15. The method of claim 7, further comprising the act of amending the text message with sender information.

16. A system for selective delivery of text messages comprising:
    a database of delivery criteria for text messages, wherein the database is adapted to be accessed by a customer to set the customer's delivery criteria for a customer's telephone number associated with the customer, wherein the customer's delivery criteria specify different destinations for messages based on customer presence information comprising global positioning system location information for the customer; and a global text gateway adapted to communicate with the database to access the customer's delivery criteria, wherein a text message telephone number associated only with the global text gateway is assigned to the global text gateway, so that text messages addressed to the text message telephone number are routed directly to the global text gateway, wherein the global text gateway is adapted to forward text messages to a communication network for delivery based on the customer's delivery criteria for the customer's telephone number, such that the global text gateway forwards text messages to a first destination when global positioning system location information indicates that the customer is present at the first destination and forwards text messages to a second destination when global positioning system location information indicates that the customer is not present at the first destination, and wherein the global text gateway is further configured to receive a reply message from the customer that is responsive to the text message, transcode the format of the reply message to a text message, and forward the transcoded text message to a sender of the text message.

\* \* \* \* \*